United States Patent
Parrilla

[11] 3,888,511
[45] June 10, 1975

[54] SAFETY DEVICE TO PREVENT TIPPING A BICYCLE

[76] Inventor: Salvatore C. Parrilla, 811 Literary Rd., Cleveland, Ohio 44113

[22] Filed: July 19, 1973

[21] Appl. No.: 380,748

[52] U.S. Cl. .................. 280/239; 280/1.189
[51] Int. Cl. .................................. B62d 63/00
[58] Field of Search .......... 280/239, 1.184, 1.189, 280/282, 289, 202, 204

[56] References Cited
UNITED STATES PATENTS

| | | | |
|---|---|---|---|
| 1,537,729 | 5/1925 | Banks | 280/1.189 |
| 3,096,100 | 7/1963 | Clarke | 280/1.184 UX |
| 3,284,096 | 11/1966 | Hansen | 280/239 X |
| 3,427,037 | 2/1969 | Marasco | 280/1.189 |
| 3,653,679 | 4/1972 | Howard | 280/239 X |

Primary Examiner—David Schonberg
Assistant Examiner—Terrance L. Siemens
Attorney, Agent, or Firm—Baldwin, Egan, Walling & Fetzer

[57] ABSTRACT

A safety device is presented to prevent a rider from tipping a bicycle over backward and injuring himself. The device is simple to construct and easy to attach to the bicycle and comprises a couple of generally parallel struts which are pivotally attached to an extension of the axle of the rear wheel of the bicycle and provides a roller at the rear end of the struts and projections at the front end of the struts adapted to overlie a portion of the main frame of the bicycle so that when the bicycle is tilted by lifting the front wheel upwardly, the roller engages the ground and the forward projections hit the frame of the bicycle to arrest the tilting of the bicycle before the rider goes over backwards.

1 Claim, 4 Drawing Figures

PATENTED JUN 10 1975 3,888,511

SAFETY DEVICE TO PREVENT TIPPING A BICYCLE

BACKGROUND OF THE INVENTION

Young people of today when riding a two-wheel bicycle often engage in the sport of pulling up on the handlebars and raising the front wheel of the bicycle while they pedal along riding on the rear wheel only. Often this is carried too far and the rider moves rearwardly past the dead center of the rear axle and, therefore, goes over backward, causing him to fall with great likelihood of serious injury to himself. It is an object of the present invention ot overcome this danger.

In the drawings,

FIG. 3 is a rear elevation of the parts of this invention disclosed in FIG. 2; while

Figure 1:
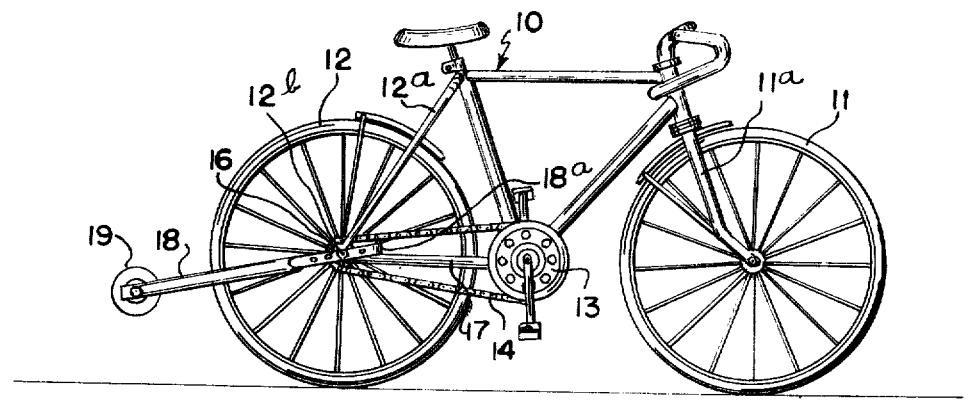
FIG. 1 is a side elevation of a bicycle equipped with the safety device of this invention.

The bicycle illustrated in the drawings is one of many forms of bicycle presently in use. The specific form of bicycle structure is not involved in this invention except insofar as certain portions will be mentioned which cooperate with the safety device of this invention.

The bicycle 10 has a front wheel 11, a rear wheel 12 and a rigid main frame which includes a fork 11a which supports the axle of the front wheel and a bifurcated structure 12a which supports the axle of the rear wheel. In the usual manner, a pedal and sprocket structure 13 is connected by drive chain 14 with a sprocket 16 which drives the rear wheel by operation of a chain in a known manner. Cooperating with the present invention are two rigid horizontal frame members 17 which extend from opposite sides of the pedal sprocket 13 to opposite sides of the rear wheel axle 12b.

Figure 4:
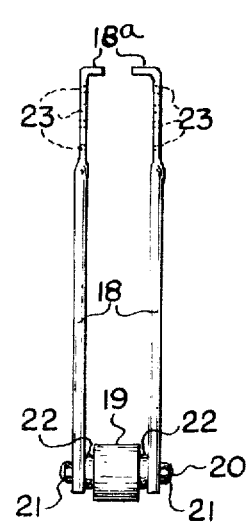
FIG. 4 is a plan view of the safety device before it is applied to a bicycle.

The safety device of this invention is clearly seen in FIG. 4 and comprises two generally parallel rigid struts 18 which at one end, are adapted to engage the ground in the use of this invention, and support a roller 19 which is rotatable on a shaft 20 which is held by nuts 21 connected to the struts. Preferably, when necessary, spacer members 22 are between the roller 19 and each of the struts 18. At the opposite end, the struts are provided with pairs of registering holes 23 in projections rigid with the struts as shown at the top of FIG. 4, which in use of the device are positioned to receive opposite ends of the bicycle rear axle 12b extended and the struts are then held in place by nuts 24 threaded on the end of the bicycle axle. When so attached, as seen in FIGS. 1 and 2, the opposite ends of the struts 18 are provided with L-shape ends 18a which overlie respectively the two rigid frame members 17.

There are a plurality of the pairs of openings 23 in the struts 18 spaced longitudinally of the struts for the purpose of adjusting the position of the ground engaging roller relative to the rear wheel 12 of the bicycle as may be necessary.

Figure 2:
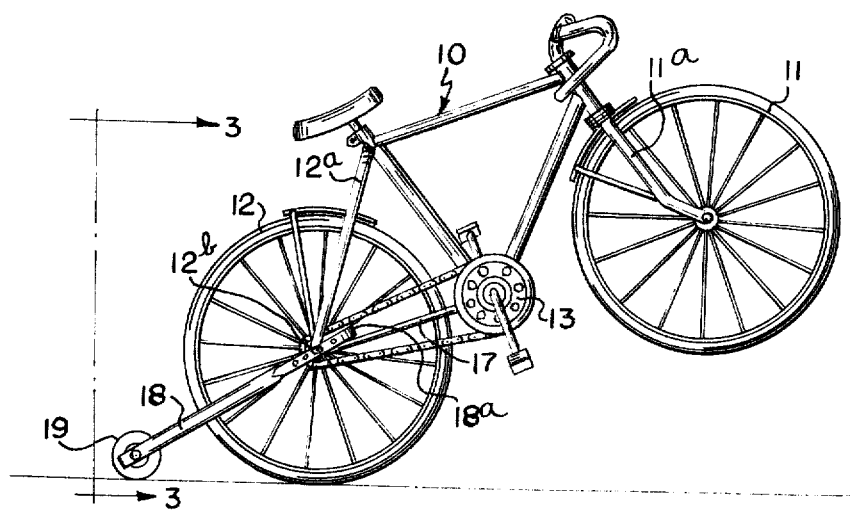
FIG. 2 is a view similar to FIG. 1 but with the front wheel raised to a position where the roller at the rear end of the safety device touches the ground.
Figure 3:
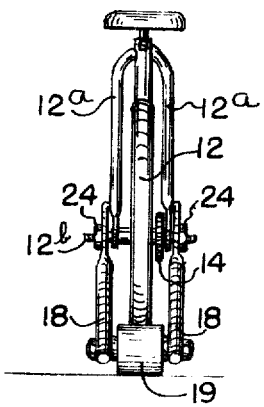

In use of the safety device of this invention, the structure shown in FIG. 4 is attached to the bicycle as shown in FIG. 1 and the parts are held in the position of FIG. 1 normally by the friction exerted by the nuts 24 which hold the struts 18 on the rear axle 12b as extended as shown in the drawings. If the rider tips the bicycle to the position of FIG. 2 by pulling upwardly on the handlebars, his motion tilting over backwardly is stopped in the position of FIG. 2 because the rigid frame members 17 moving in a counterclockwise direction engage the projections 18a causing the struts 18 to apply the roller 19 firmly to the ground, after which the bicycle can tilt rearwardly no farther.

What is claimed is:

1. A safety device for attachment to a bicycle having a main frame and front and rear wheels to prevent the same being tipped over backward by its rider, said frame having two linear rigid horizontal frame members extending from opposite sides of a pedal sprocket to opposite sides of a rear wheel axle, comprising a pair of rigid struts generally parallel, a rotatable roller connected between said struts at one end adapted to engage the ground when the bicycle is tipped backward, a parallel projection means rigid with and extending from near the opposite ends of said struts with L-shape ends in position to overlie said horizontal frame members respectively, said struts being pivoted to said frame at a point along said projection means on the extended axle of said rear wheel, and a plurality of pairs of spaced registering openings through said projection means in position for varying said attachment to said bicycle frame.

\* \* \* \* \*